Aug. 11, 1936.   E. W. PACE   2,050,542

FRICTIONAL DRIVE MECHANISM

Filed Oct. 28, 1935

Inventor
Edwin W. Pace

By  W. J. M. Howell

Attorney

Patented Aug. 11, 1936

2,050,542

UNITED STATES PATENT OFFICE 2,050,542

FRICTIONAL DRIVE MECHANISM

Edwin W. Pace, Chicago, Ill., assignor to Pace Manufacturing Company, Chicago, Ill., a corporation of Illinois Application October 28, 1935, Serial No. 47,050

4 Claims. (Cl. 64—30)

This invention relates to an improved frictional clutch mechanism by which power may be imparted from a driving to a driven member and wherein provision is made for non-driving slippage between said members when unusual resistance to the rotation of the driven member is encountered.

It is an object of the present invention to provide a clutch mechanism of this character of simple, efficient and improved construction and wherein provision is made for adjusting the mechanism to render it suitable for the operating conditions in connection with which it is employed.

For a further understanding of the invention, reference is to be had to the following description and the accompanying drawing, wherein.

Figure 1:
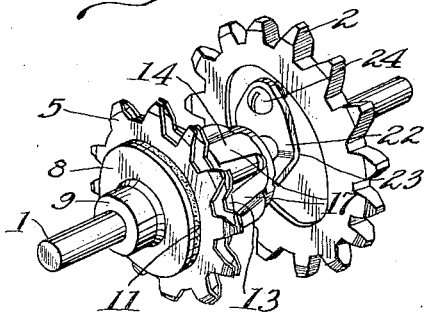
Fig. 1 is a perspective view of the frictional clutch mechanism when employed for imparting motion from a drive sprocket to a driven sprocket, with both sprockets mounted on a single shaft.

Referring more particularly to the drawing, the numeral 1 designates a drive shaft. Mounted upon this shaft is a driving sprocket 2, the hub 3 of which is pinned or otherwise secured as at 4 to the shaft 1, whereby upon the rotation of the sprocket 2, corresponding motion will be imparted to said shaft. Loosely mounted on the shaft 1 for movement relative to the latter is a driven sprocket 5 which, in this instance, is formed from a pair of flat metallic plates between which a filler disk is disposed, said plates of the sprocket and the filler disk being connected by transverse rivets or their equivalents 7. The spaced transverse plates of the sprocket 5 have their outer edges formed with sprocket teeth of conventional outline.

In order to enable the shaft 1 to drive the sprocket 5 but to permit of slippage of the latter in event of overloading or other motion arresting conditions, there is arranged on the shaft 1 a circular head 8, the hub 9 of which is pinned or otherwise secured as at 10 to the shaft 1 so that the head 8 will revolve in unison with the shaft. Arranged between the head 8 and one side of the sprocket 5 is a disk 11, preferably of a hardened fiber composition with which one side of the sprocket 5 is maintained in firm frictional engagement. The opposite side of the sprocket also cooperates with a similar composition disk 12 which is engaged by a pressure head 13 over the full area thereof. The adjoining surfaces of the heads 8 and 13, the disks 11 and 12 and the sprocket 5 are maintained in frictional driving contact by the provision of a metallic thrust spider 14 which is formed to include a central region 15 apertured as at 16 for the reception of the drive shaft 1. From the peripheral portion of the central region, the spider 14 includes laterally bent foot extensions 17 which press upon the pressure head 13 and contact with studs 18 which integrally project from the outer face of the head 13. Also, the central region of the spider 14 is transversely grooved as at 19 for the reception of similarly formed ribs 20 carried in connection with a metallic washer 21.

The engagement of the ribs 20 with the grooves 19 of the spider 14 is obtained through the provision of a bell crank lever 22 which has a fulcrumed engagement as at 23 with one side of the driving sprocket 2. The longer radially extending arm of the lever 22 has its outer end provided with an opening for the reception of the threaded shank of an adjusting screw 24, said shank of the screw 24 being received within a threaded opening 25, formed in the driving sprocket 2. The lower or inner portion of the lever 22 is bifurcated to include the laterally projecting arms 26 which have their forward extremities received within grooves formed by the presence of the ribs 20 in the washer 21.

Figure 2:
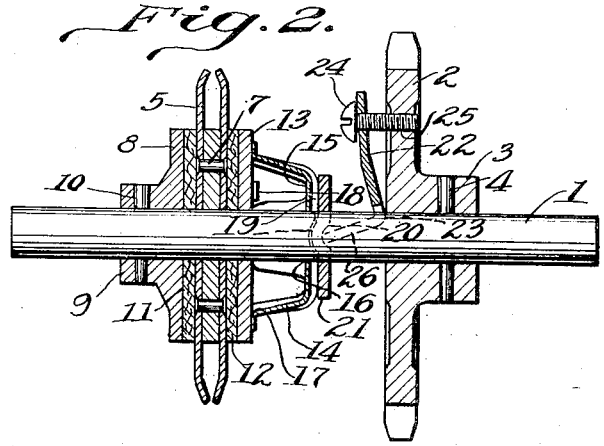
Fig. 2 is a vertical longitudinal sectional view taken through the clutch mechanism and the associated sprockets.
Figure 3:
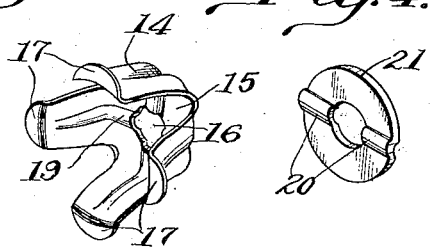
Fig. 3 is a perspective view of the thrust spider of the clutch.
Figure 4:
Fig. 4 is a similar view of the anchoring.
Figure 5:
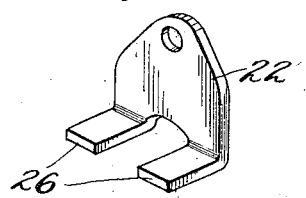
Fig. 5 is a perspective view of the pressure applying lever.

In the use of this mechanism, the lever 22 is positioned as shown in Fig. 2, and the screw 24 tightened so that the washer 21 will impart longitudinal thrust to the spider 14, which, in turn, is imparted to the head 13 and the disks 11 and 12, the head 8 and the frictionally confined driven sprocket 5. Normally, the driven sprocket will rotate in unison with the driving sprocket 2 but if for any reason the driven sprocket should encounter an obstacle or unusual resistance to its turning movement, slippage will be afforded to protect the driven mechanism against injury. Obviously, it is within the scope of the invention to change the form of the driving and driven members 2 and 5 respectively. For instance, these elements may be in the form of gears as well as sprockets, or other well known mechanical forms.

Other modifications will be apparent to those skilled in the art and I therefore reserve the right to employ such changes and departures in my construction from that disclosed herein without departing from the scope of the following claims.

What is claimed is:

1. In friction drive mechanism, an axial member, a drive member fixed to rotate with the axial member, a driven member mounted on and rotatable independently of the axial member, a friction head engageable with one side of said driven member and rotatable in unison with said axial member, a second friction head engageable with the opposite side of said driven member and movable longitudinally of the axial member, and adjustable lever means carried by said drive member and engageable with and exercising a constantly applied pressure on the movable friction head to maintain the latter and the fixed friction head in driving engagement with said driven member.

2. Frictional drive mechanism comprising an axial support, a drive member fixed to rotate with said support, a stationary friction head fixed to rotate with said support, a driven member mounted on said support for rotation independently of the latter and normally engaged with said friction head, a slidable friction head carried by said support between the driving and driven members, and an adjustable lever element carried by the driving member and cooperative with the slidable friction head to constantly maintain the latter in frictional driving engagement with the driven member.

3. A friction clutch comprising, in combination, an axial support, spaced drive and driven members mounted on said support, one of said members being fixed to rotate with said support and the other of said members being independently rotatable thereon, a stationary friction head fixed to rotate with said support and maintained in constant engagement with one side of said independently rotatable member, a slidable friction head mounted on said support between said members and engageable with the opposite side of said independently rotatable member as regards the stationary friction head, and a bell crank lever carried by the member fixed to rotate with said support and cooperative with said slidable friction head to maintain the latter in constant frictional engagement with said independently rotatable member.

4. A friction clutch comprising, in combination, an axial support, spaced drive and driven members mounted on said support, one of said members being fixed to rotate with said support and the other of said members being independently rotatable thereon, a stationary friction head fixed to rotate with said support and maintained in constant engagement with one side of said independent rotatable member, a slidable friction head mounted on said support between said members and engageable with the opposite side of said independently rotatable member as regards the stationary friction head, a bell crank lever carried by the member fixed to rotate with said support and cooperative with said slidable friction head to maintain the latter in constant frictional engagement with said independently rotatable member, and threaded means coacting with said bell crank lever and the member fixed on said support to vary the degree of pressure constantly exercised by the slidable friction head on said independently rotatable member.

EDWIN W. PACE.